US012632909B2

(12) United States Patent
Ibrahim

(10) Patent No.: US 12,632,909 B2
(45) Date of Patent: May 19, 2026

(54) AUTOMATED REMOTE PAYMENTS BETWEEN A VEHICLE AND A REFUELING STATION

(71) Applicant: AMERICAN EXPRESS TRAVEL RELATED SERVICES COMPANY, INC., New York, NY (US)

(72) Inventor: Wael Ibrahim, San Diego, CA (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 18/541,857

(22) Filed: Dec. 15, 2023

(65) Prior Publication Data

US 2024/0127371 A1     Apr. 18, 2024

Related U.S. Application Data

(63) Continuation of application No. 16/002,877, filed on Jun. 7, 2018, now Pat. No. 11,875,418.

(51) Int. Cl.
G06Q 50/06 (2024.01)
G06Q 20/18 (2012.01)
(Continued)

(52) U.S. Cl.
CPC ............. G06Q 50/06 (2013.01); G06Q 20/18 (2013.01); G06Q 20/3829 (2013.01); G06Q 20/40 (2013.01); G06Q 2220/00 (2013.01)

(58) Field of Classification Search
CPC ........... G06Q 20/02–027; G06Q 20/40–40975
See application file for complete search history.

(56) References Cited

U.S. PATENT DOCUMENTS 8,863,256 B1     10/2014  Addepalli et al.
10,131,531 B1     11/2018  Prasad et al.
(Continued)

FOREIGN PATENT DOCUMENTS

WO     WO-2013140196 A1     9/2013
WO     WO-2017223039 A1     12/2017

OTHER PUBLICATIONS

International Search Report and Written Opinion of the International Searching Authority directed to related International Patent Application No. PCT/US2019/035585, dated Sep. 5, 2019; 11 pages.

*Primary Examiner* — Jay Huang
(74) *Attorney, Agent, or Firm* — STERNE, KESSLER, GOLDSTEIN & FOX P.L.L.C.

(57)     ABSTRACT

A system and method for automated remote payments between a vehicle and a refueling station is disclosed. The system may enable the vehicle to initiate an automated remote payment to the refueling station without needing the user to manually input transaction account information, or to manually prepay for the transaction. The refueling station may detect when the vehicle is in proximity, and the vehicle and the refueling station may open communications to transmit data. The vehicle may transmit vehicle identifying data to the refueling station, and the refueling station may communicate the vehicle identifying data to a payment network to authorize the transaction. In response to authorizing the transaction, the vehicle may proceed with refueling at the refueling station.

20 Claims, 4 Drawing Sheets

(51) Int. Cl.
  *G06Q 20/38*    (2012.01)
  *G06Q 20/40*    (2012.01)

(56)    References Cited

U.S. PATENT DOCUMENTS

| | | | |
|---|---|---|---|
| 10,140,645 B2 | 11/2018 | Driscoll et al. | |
| 10,469,248 B2 | 11/2019 | Chalakudi et al. | |
| 10,504,094 B1* | 12/2019 | Gaudin | B60W 60/00 |
| 10,567,320 B2 | 2/2020 | Chalakudi et al. | |
| 10,642,967 B2 | 5/2020 | Balaraman et al. | |
| 10,832,247 B2 | 11/2020 | Durvasula et al. | |
| 11,449,887 B2 | 9/2022 | Durvasula et al. | |
| 11,461,768 B2 | 10/2022 | Chalakudi et al. | |
| 11,875,418 B2 | 1/2024 | Ibrahim | |
| 2010/0211272 A1 | 8/2010 | Ichihara | |
| 2012/0095920 A1 | 4/2012 | McQuade et al. | |
| 2013/0085928 A1 | 4/2013 | McKinney | |
| 2013/0212007 A1 | 8/2013 | Mattsson et al. | |
| 2013/0232019 A1 | 9/2013 | Frieden et al. | |
| 2014/0188730 A1* | 7/2014 | Murgai | G06Q 20/40145 |
| | | | 705/44 |
| 2015/0199685 A1* | 7/2015 | Betancourt | G06Q 20/40 |
| | | | 705/44 |
| 2015/0242855 A1* | 8/2015 | Vilnai | H04N 7/183 |
| | | | 705/44 |
| 2015/0352947 A1* | 12/2015 | Hubschman | H04W 4/029 |
| | | | 340/450.2 |
| 2016/0012657 A1* | 1/2016 | Reineccius | G06Q 50/40 |
| | | | 340/5.2 |
| 2016/0025506 A1 | 1/2016 | Penilla et al. | |
| 2016/0035001 A1* | 2/2016 | Driscoll | G06Q 30/0631 |
| | | | 705/26.7 |
| 2016/0180343 A1 | 6/2016 | Poon et al. | |
| 2017/0148113 A1* | 5/2017 | Yasko | G06Q 40/04 |
| 2017/0171178 A1 | 6/2017 | Reynders | |
| 2017/0272418 A1* | 9/2017 | Kim | H04L 63/08 |
| 2018/0053178 A1 | 2/2018 | Shah | |
| 2018/0121684 A1 | 5/2018 | Goldberg et al. | |
| 2018/0158150 A1* | 6/2018 | Li | G07F 15/005 |
| 2019/0106317 A1* | 4/2019 | Sahota | B67D 7/08 |
| 2019/0116044 A1 | 4/2019 | Matsumoto | |
| 2019/0139029 A1* | 5/2019 | Kadiwala | H04L 9/30 |
| 2019/0164157 A1 | 5/2019 | Balaraman et al. | |
| 2019/0236592 A1 | 8/2019 | Arora | |
| 2019/0244205 A1 | 8/2019 | Fieglein et al. | |
| 2019/0303920 A1 | 10/2019 | Balaraman et al. | |
| 2019/0303942 A1 | 10/2019 | Balaraman et al. | |
| 2019/0378220 A1 | 12/2019 | Ibrahim | |

\* cited by examiner

170 PAYMENT NETWORK

140

110

100

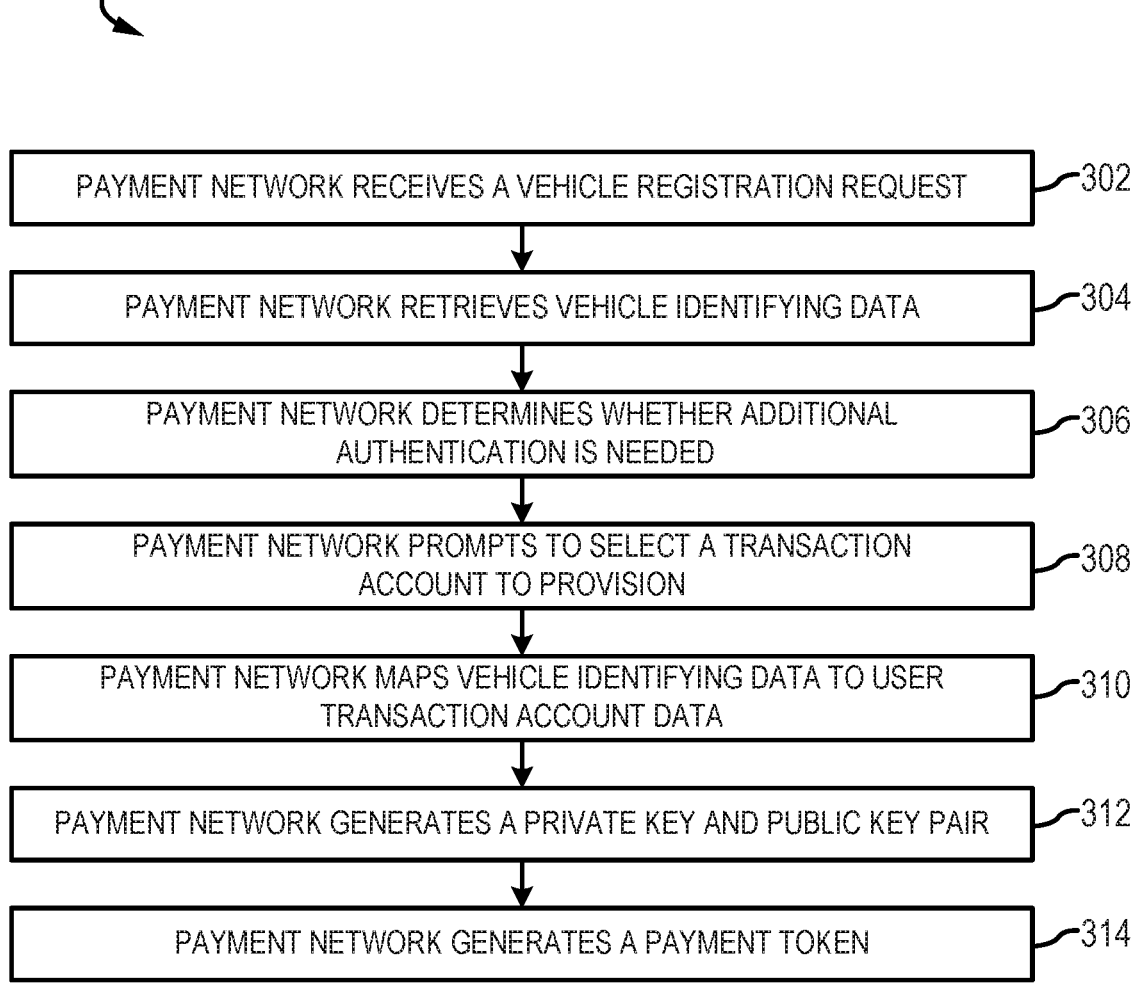

301

PAYMENT NETWORK RECEIVES A VEHICLE REGISTRATION REQUEST ─302

PAYMENT NETWORK RETRIEVES VEHICLE IDENTIFYING DATA ─304

PAYMENT NETWORK DETERMINES WHETHER ADDITIONAL AUTHENTICATION IS NEEDED ─306

PAYMENT NETWORK PROMPTS TO SELECT A TRANSACTION ACCOUNT TO PROVISION ─308

PAYMENT NETWORK MAPS VEHICLE IDENTIFYING DATA TO USER TRANSACTION ACCOUNT DATA ─310

PAYMENT NETWORK GENERATES A PRIVATE KEY AND PUBLIC KEY PAIR ─312

PAYMENT NETWORK GENERATES A PAYMENT TOKEN ─314

FIG. 3

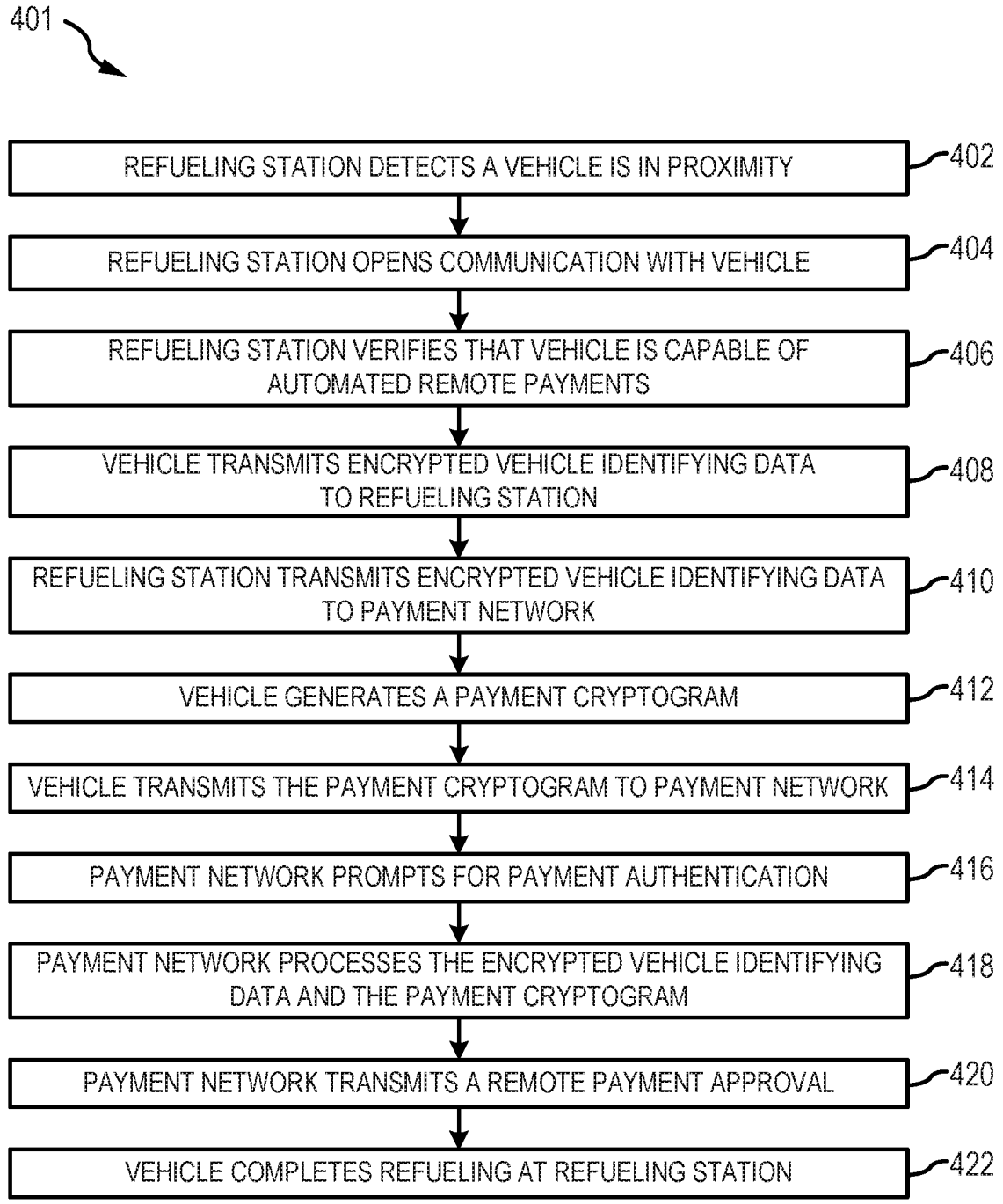

401

| REFUELING STATION DETECTS A VEHICLE IS IN PROXIMITY | 402 |
| REFUELING STATION OPENS COMMUNICATION WITH VEHICLE | 404 |
| REFUELING STATION VERIFIES THAT VEHICLE IS CAPABLE OF AUTOMATED REMOTE PAYMENTS | 406 |
| VEHICLE TRANSMITS ENCRYPTED VEHICLE IDENTIFYING DATA TO REFUELING STATION | 408 |
| REFUELING STATION TRANSMITS ENCRYPTED VEHICLE IDENTIFYING DATA TO PAYMENT NETWORK | 410 |
| VEHICLE GENERATES A PAYMENT CRYPTOGRAM | 412 |
| VEHICLE TRANSMITS THE PAYMENT CRYPTOGRAM TO PAYMENT NETWORK | 414 |
| PAYMENT NETWORK PROMPTS FOR PAYMENT AUTHENTICATION | 416 |
| PAYMENT NETWORK PROCESSES THE ENCRYPTED VEHICLE IDENTIFYING DATA AND THE PAYMENT CRYPTOGRAM | 418 |
| PAYMENT NETWORK TRANSMITS A REMOTE PAYMENT APPROVAL | 420 |
| VEHICLE COMPLETES REFUELING AT REFUELING STATION | 422 |

FIG. 4

AUTOMATED REMOTE PAYMENTS BETWEEN A VEHICLE AND A REFUELING STATION

CROSS-REFERENCE TO RELATED PATENT APPLICATIONS

This application is a continuation of U.S. application Ser. No. 16/002,877, filed on Jun. 7, 2018, which is incorporated herein by reference in its entirety.

FIELD

This disclosure generally relates to transactions involving a refueling station, and more particularly, to systems and methods for automated remote payments between a vehicle and a refueling station.

BACKGROUND

Users may patron a refueling station to refuel one or more vehicles with gasoline, electricity, and/or other vehicular fuels. Users typically exit the vehicle and manually prepay for the transaction prior to refueling the vehicle. For example, users may interact with the individual refueling station to enter transaction account information (e.g., by inserting or swiping a transaction card, by interacting with an NFC enabled point of sale, etc.) and the transaction account may be authorized prior to beginning the transaction. As a further example, users may engage refueling station personnel to manually prepay using a fiat currency (e.g., $20.00). In response to the transaction being less than the prepaid fiat currency amount, the user may reengage the refueling station personnel to retrieve the difference.

SUMMARY

A system, method, and computer readable medium (collectively, the "system") is disclosed for automated remote payments between a vehicle and a refueling station. The system may comprise a remote payment system located in a vehicle. The remote payment system may receive a communications broadcast handshake from a communications module of a refueling station, wherein the refueling station is configured to transmit the communications broadcast handshake in response to detecting the vehicle in proximity of the refueling station and detecting a communications broadcast from the remote payment system. The remote payment system may transmit, via a trusted platform module (TPM), vehicle identifying data to the refueling station, wherein in response to receiving the vehicle identifying data the refueling station is configured to transmit the vehicle identifying data to a payment network to authorize payment. The remote payment system may receive from the payment network a remote payment approval to begin refueling the vehicle.

In various embodiments, the remote payment system may receive from the refueling system refueling data comprising a refueling option and a refueling price. The remote payment system may retrieve from a fuel system of the vehicle a fuel system refuel amount. The remote payment system may generate a payment cryptogram based on the fuel system refuel amount and the refueling data. The remote payment system may transmit the payment cryptogram to the payment network.

In various embodiments, the remote payment system may transmit a remote payment registration request to the payment network, wherein in response to receiving the remote payment registration the payment network prompts the remote payment system to transmit vehicle identifying data. The remote payment system may transmit the vehicle identifying data to the payment network, wherein the payment network is configured to associate the vehicle identifying data with transaction account data. The remote payment system may receive a private key and public key pair from the payment network, wherein the private key and public key pair are stored in the TPM. The remote payment system may transmit a transaction account number to provision for automated remote payments, wherein the payment network is configured to generate a payment token based on the transaction account corresponding to the transaction account number. In response to receiving the vehicle identifying data, the payment network may be configured to prompt the remote payment system to transmit user identifying data or a multi-factor authentication input.

In various embodiments, in response to receiving the remote payment approval, the remote payment system may be configured to instruct the fuel system of the vehicle to at least one of unlock or open a gas tank refueling cover.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. However, a more complete understanding of the present disclosure may be obtained by referring to the detailed description and claims when considered in connection with the drawing figures, wherein like numerals denote like elements.

FIG. 3 illustrates a process flow for registering a vehicle for automated remote payments, in accordance with various embodiments; and FIG. 4 illustrates a process flow for initiating an automated remote payment between a vehicle and a refueling station, in accordance with various embodiments.

DETAILED DESCRIPTION

Figure 1:
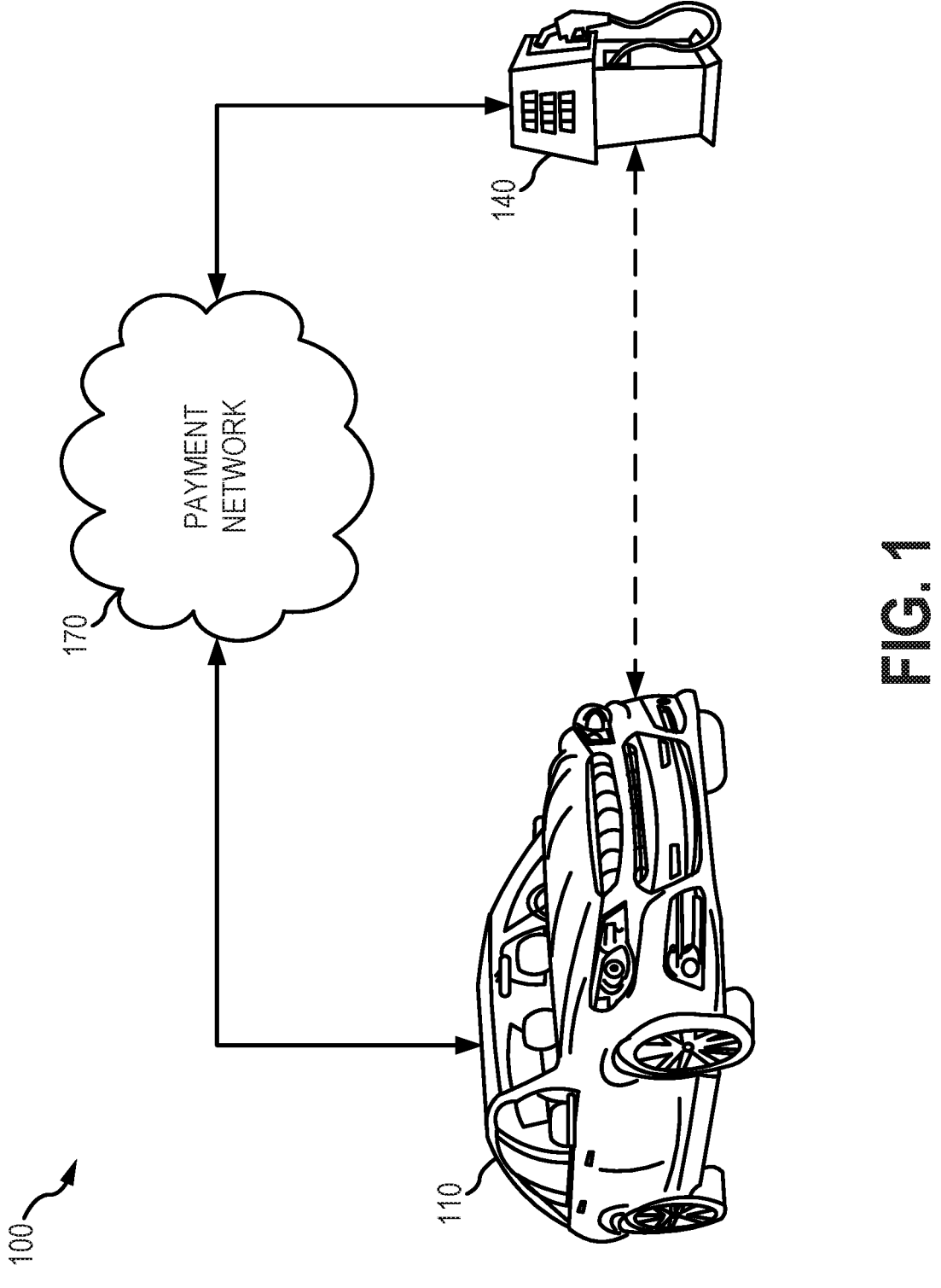
FIG. 1 is a block diagram illustrating a system for automated remote payments between a vehicle and a refueling station, in accordance with various embodiments.

The detailed description of various embodiments refers to the accompanying drawings, which show various embodiments by way of illustration. While these various embodiments are described in sufficient detail to enable those skilled in the art to practice the disclosure, it should be understood that other embodiments may be realized and that logical and physical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, systems, methods, and computer readable mediums (collectively, the "system") for automated remote payments between a vehicle and a refueling station are disclosed. The system may allow the vehicle to initiate an automated remote payment to the refueling station without needing the user to manually input transaction account information. For example, the refueling station may detect when the vehicle is in proximity to the individual refueling station (e.g., gas pump) and may initiate communications with the vehicle. The vehicle may transmit vehicle identifying information to the refueling station and a payment cryptogram to a payment network. The refueling station may transmit the vehicle identifying information to the payment network. The payment network may retrieve transaction account data corresponding to the vehicle identifying information and may use the payment cryptogram together with the retrieved transaction account data to authorize the transaction. The payment cryptogram may comprise a precise cost of the transaction such as, for example, by the system interacting with the fuel system of the vehicle to determine the amount of fuel needed during a refill, and to calculate the cost of the transaction based on the amount of needed fuel and the cost of the refill (e.g., price per a gallon of gasoline, etc.). The payment cryptogram may also comprise a maximum transaction amount and/or any other payment restriction. In response to the transaction being authorized, the user may interact with the individual refueling station to refuel the vehicle.

The system and process improves the functioning of the computer. For example, by transmitting, storing, and accessing data using the processes described herein, the security of the data is improved, which decreases the risk of the computer, network, or transaction account number from being compromised. In that regard, the system and process may improve security at the device and/or software level, and may improve security of data transmissions in the payment network. Moreover, the system and process may decrease fraudulent transactions and the susceptibility of payment information being compromised over the payment network.

As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data," "information," or the like may include encompassing information such as commands, queries, files, messages, data for storage, and the like in digital or any other form.

With reference to FIG. 1, a system lot) for automated remote payments between a vehicle and a refueling station is depicted, according to various embodiments. System 100 may comprise one or more of a vehicle 110, a refueling station 140, and/or a payment network 170. System 100 may enable one or more vehicles 110 to initiate and complete automated remote payments at various refueling stations 140 without needing (or with minimal) user input and/or a pre-authorized payment prior to refueling at the refueling station 140. System 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing.

In various embodiments, vehicle 110 may comprise any suitable or desired vehicle such as, for example, a car, a truck, a sports utility vehicle (SUV), a motorcycle, a scooter, an all-terrain vehicle (ATV), a utility terrain vehicle (UTV), a golf cart, an electric bicycle, a boat, and/or any other type of vehicle that is powered at least partially by a fuel (e.g., gasoline, diesel, biofuels, electricity, alternative fuels, etc.). Vehicle 110 may comprise any number of systems and subsystems such as, for example, an engine (which may include lubrication systems, cooling systems, etc.), a fuel system, an ignition system, an exhaust system, an electrical system, a drive train, a frame and/or body (which may include wheels and tires), a suspension system, a steering system, a braking system, and/or any other suitable or desired systems. Vehicle 110 may also comprise supplementary systems or sub-systems, such as, for example a supplementary restraint system (e.g., having seat belts, air bags, etc.), a climate control system, an entertainment system (e.g., a central control device, a sound system, a communications system, etc.), a global positioning system (GPS), and/or the like.

Figure 2:
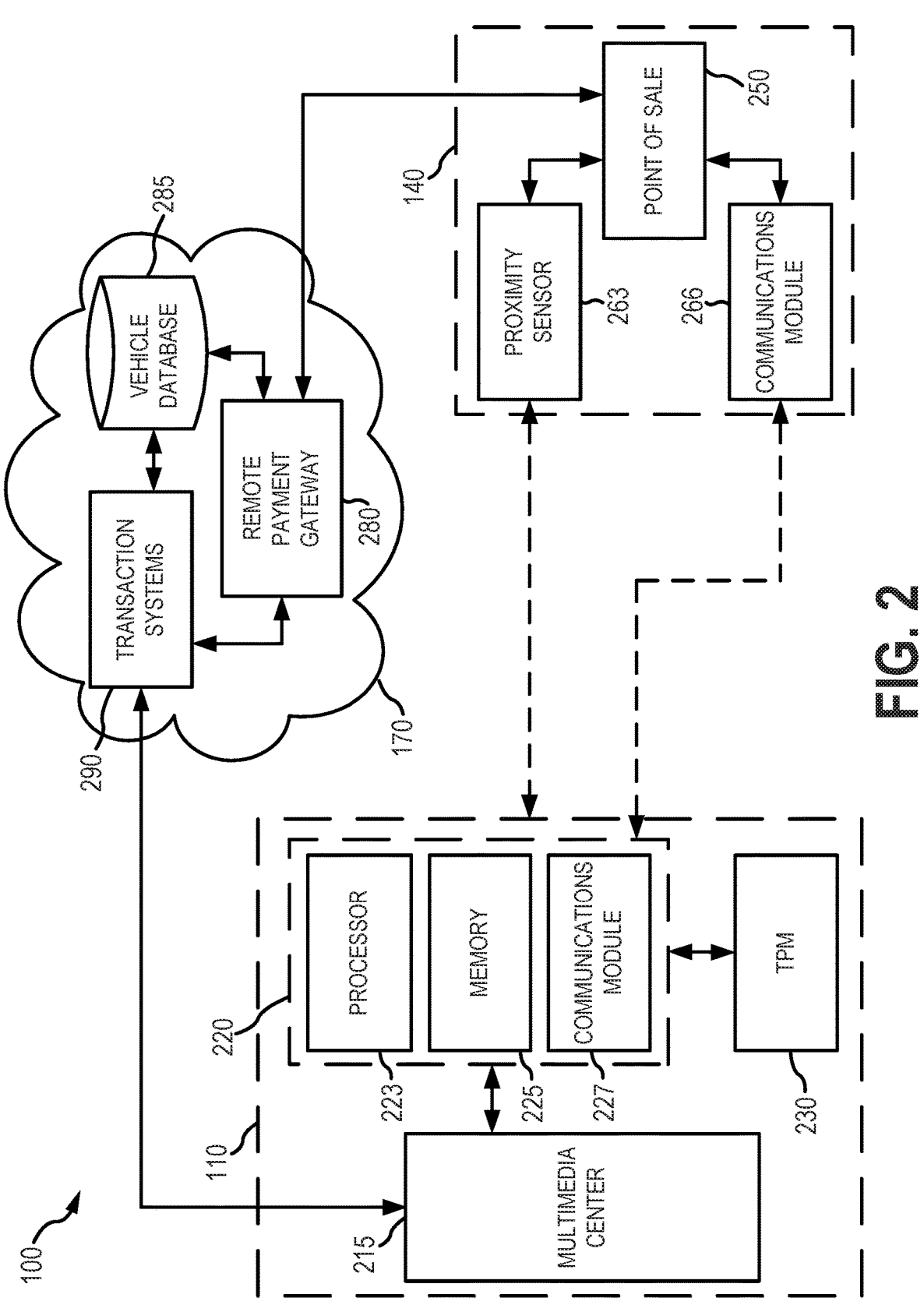
FIG. 2 is a block diagram illustrating exemplary system components in a system for automated remote payments between a vehicle and a refueling station, in accordance with various embodiments.

In various embodiments, and with reference to FIG. 2, components of vehicle 110 are depicted in greater detail. Vehicle 110 may comprise one or more of a multimedia center 215, a remote payment system 220, and/or a trusted platform module (TPM) 230. The various systems, modules, platforms, centers, and the like in vehicle 110 may be in direct logical communication with each other via a bus, network, and/or through any other suitable means, or may be individually connected as described further herein. For the sake of brevity, conventional data networking, application development, and other functional aspects of vehicle 110 (and components of the individual operating components of vehicle 110) may not be described in detail herein. Furthermore, the connecting lines shown in the various figures contained herein are intended to represent exemplary functional relationships and/or physical couplings between the various elements in vehicle 110. It should be noted that many alternative or additional functional relationships or physical connections may be present in a practical system. For example, and in accordance with various embodiments, the individual components of vehicle 110 may be interconnected via a controller area network (CAN) or CAN bus in vehicle 110.

In various embodiments, multimedia center 215 may comprise a control mechanism to allow a user to access and control various components of vehicle 110 such as, for example, the climate control system, the radio and/or sound system, the GPS system, remote payment system 220, and the like. Multimedia center 215 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein. Multimedia center 215 may also comprise a user interface in logical communication with the processor. The user interface may comprise a touchscreen or similar display capable of displaying a graphical user interface and accepting user input. Multimedia center 215 may also comprise (and/or be in logical communication with) one or more networking interfaces. A network interface may allow data to be transferred between multimedia center 215 and external devices or components. For example, the network interface may comprise a modem, an Ethernet card, a communications port, a Personal Computer Memory Card International Association (PCMCIA) slot and card, or the like. Data transferred over the network interface may be in the form of signals which may be electronic, electromagnetic, optical, or other signals capable of being transmitted and received by the network interface. The network interface may transmit data using any wireless transmission standard such as, for example, Bluetooth, Wi-Fi, over a cellular network, or using any other suitable or desired wireless transmission.

In various embodiments, multimedia center 215 may also comprise (and/or be in logical communication with) a biometric security system. The biometric security system may be used for providing biometrics as a secondary form of identification. The biometric security system may include a biometric sensor that detects biometric samples. The biometric security system may be configured with one or more biometric scanners, processors and/or systems. The biometric security system may include one or more technologies, or any portion thereof, configured to detect and receive a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system attribute and/or other characteristic, or any portion thereof.

In various embodiments, remote payment system 220 may be configured to allow vehicle 110 to register for automated remote payments and to complete transactions at one or more refueling stations 140. Remote payment system 220 may be in logical and/or electronic communication with multimedia center 215 and/or TPM 230. Remote payment system 220 may also be in logical and/or electronic communication with internal components and systems of vehicle 110 such as, for example, the fuel system, the GPS, and/or the like. As discussed further herein, remote payment system 220 may also be configured to communicate with refueling station 140 and/or payment network 170. Remote payment system 220 may comprise an Internet of Things (IoT) device, such as, for example a RASPBERRY PI®. Remote payment system 220 may comprise at least one computing device in the form of a computer or processor, or a set of computers/processors. In various embodiments, remote payment system 220 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, remote payment system 220 may comprise one or more of a processor 223, a memory 225, and/or a communications module 227. Processor 223 may comprise any number of processors, and may also include any combination of processing circuits known in the art, such as one or more microprocessors, microcontrollers, digital signal processors, and/or programmable logic devices. Processor 233 may be configured to execute instructions stored on a tangible, non-transitory computer readable medium, causing processor 233 to perform various operations, as discussed further herein.

Memory 225 may be configured to provide secure storage to remote payment system 220. For example, memory 225 may comprise read-only protected memory and may be populated with vehicle identifying data. The vehicle identifying data may comprise characteristics corresponding to vehicle 110 such as, for example, the vehicle identification number (VIN), the vehicle manufacture date, the vehicle make, the vehicle model, or the like. In that respect, and in accordance with various embodiments, the vehicle identifying data may be populated by the vehicle 110 manufacture prior to sale of the vehicle.

Communications module 227 (e.g., the vehicle communication module) may be configured to communicate with refueling stations 140 during the automated remote payment process, as discussed further herein. Communications module 227 may comprise any suitable network interface capable of transmitting and receiving data, such as, for example a modem, an Ethernet card, a communications port, a Personal Computer Memory Card International Association (PCMCIA) slot and card, or the like. Data transferred over communications module 227 may be in the form of signals which may be electronic, electromagnetic, optical, or other signals capable of being transmitted and received by the network interface. Communications module 227 may transmit data using any wireless transmission standard such as, for example. Bluetooth, Wi-Fi, over a cellular network, or using any other suitable or desired wireless transmission. Communications module 227 may also transmit data using Bluetooth Low Energy (Bluetooth LTE) operating in the 2.4 GHz ISM band.

In various embodiments, TPM 230 may be configured to store, manage, and maintain digital keys for asymmetric encryption of data payloads, provide data cryptoprocessing and authentication of vehicle 110, and store and maintain data regarding the state and integrity of remote payment system 220. TPM 230 may be in electronic and/or logical communication with remote payment system 220 and may comprise any suitable combination of hardware, software, and/or database components. For example, TPM 230 may comprise a hardware security module (HSM), a microcontroller, a microchip, or any other secure hardware component capable of storing and maintaining digital encryption keys. In various embodiments, TPM 230 may be configured to act as the root of trust (RoT) in vehicle 110. For example, TPM 230 may be configured to store and maintain data regarding vehicle 110 and/or remote payment system 220, such as, for example, software versions, current vehicle 110 metrics, and/or the like. In that regard, TPM 230 may also be configured to determine whether vehicle 110 and/or remote payment system 220 has been tampered with, rooted, or the like. TPM 230 may report the integrity of vehicle 110 and/or remote payment system 220 to payment network 170, such as, for example, during registration and/or a payment process.

In various embodiments, during registration with payment network 170, vehicle 110 may be assigned an asymmetric private/public key pair (e.g., generated using storage root key (SRK), a platform storage root key (P-SRK), etc.). TPM 230 may be configured to securely store the private key to allow vehicle 110 (e.g., via remote payment system 220) to encrypt and decrypt data during transmissions in system 100. In various embodiments, TPM 230 may be configured to restrict use of and access to the private key. For example, TPM 230 may restrict use of the private key based on whether vehicle 110 is within a given location; whether vehicle 110 is running a specific version of an application, device driver, or software; whether vehicle 110 was authenticated using a biometric input; in response to vehicle 110 communicating with a specific vendor's point of sale (POS) terminal; and/or based on any other suitable restriction. In various embodiments. TPM 230 may also be configured to encrypt payloads using any suitable type of encryption algorithm, such as, for example an encryption algorithm under the AES, RSA, DES or the like encryption families. TPM 230 may also be configured to digitally sign the payload prior to transmission, and may implement HMAC and/or any other suitable hash-based message authentication code. TPM 230 may also be configured to ensure secure transmissions of data, such as, for example, by implementing transport layer security (TLS) such as TLS 1.2.

In various embodiments, and with reference again to FIG. 1, refueling station 140 may comprise any suitable refueling station offering fuel for vehicles 110. For example, refueling station 140 may comprise a gas station, a filling station, an electric vehicle charging station, an alternative fueling station, and/or the like. Each refueling station 140 may comprise one or more gas pumps, electric vehicle chargers, or the like, configured to provide fuel to vehicles 110. For example, a gas pump may provide gasoline or alternative fuels to vehicles 110, charging stations may provide electricity to vehicles 110, and the like. Vehicles 110 may typically refuel at refueling station 140 by approaching the refueling station 140, entering payment credentials (e.g., swiping a transaction card, initiating an automated remote payment, etc.) to initiate the transaction, and discharging fuel into the vehicle (e.g., via a gas pump, charging station, etc.).

In various embodiments, and with reference again to FIG. 2, refueling station 140 is depicted in greater detail. Refueling station 140 may comprise various hardware and software components configured to detect one or more vehicles 110 and to initiate and complete automated remote payments. In that regard, and in accordance with various embodiments, refueling station 140 may comprise a proximity sensor 263, a communications module 266, and/or a point of sale 250. The various systems, modules, platforms, module, and the like in refueling station 140 may be in direct logical communication with each other via a bus, network, and/or through any other suitable means, or may be individually connected as described further herein. For the sake of brevity, conventional data networking, application development, and other functional aspects of refueling station 140 (and components of the individual operating components of refueling station 140) may not be described in detail herein. Furthermore, the connecting lines shown in the various figures contained herein are intended to represent exemplary functional relationships and/or physical couplings between the various elements in refueling station 140. It should be noted that many alternative or additional functional relationships or physical connections may be present in a practical system.

Point of sale 250 may incorporate hardware, software, and/or database components, and may include one or more processors and memory. Point of sale 250 may be in electronic and/or logical communication with proximity sensor 263 and/or communications module 266. Point of sale 250 may be configured to enable refueling station 140 to receive automated remote payments from vehicle 110 and submit a request to authorize the payment to payment network 170. In that regard, point of sale 250 may be in electronic communication with payment network 170 such as, for example, via remote payment gateway 280.

Proximity sensor 263 may be configured to detect vehicles 110 in response to a vehicle 110 being in proximity of an individual refueling station 140 (e.g., within 5 feet (1.5 meters)). Proximity sensor 263 may comprise any suitable device capable of detecting a vehicle 110. For example, proximity sensor 263 may comprise one or more of a physical pressure switch, a reed switch, a camera, an infrared sensor, a depth sensor (e.g., a MICROSOFT® Kinect®, an ASUS® Xtion PRO®, etc.), a 3D scanner, an ultrasound range finder, a radar sensor, or the like. Proximity sensor 263 may also comprise a QR-code reader and may be configured to detect and scan a QR-code located on vehicle 110. In response to locating a vehicle 110, proximity sensor 263 may notify point of sale 250 that a vehicle 110 is present at refueling station 140.

Communications module 266 (e.g., a refueling station communications module) may be configured to communicate with vehicle 110 to initiate an automated remote payment. For example, in response to proximity sensor 263 notifying point of sale 250 that vehicle 110 is in proximity to refueling station 140, point of sale 250 may instruct communications module 266 to begin communicating with vehicle 110. Communications module 266 may comprise any suitable network interface capable of transmitting and receiving data, such as, for example a modem, an Ethernet card, a communications port, a Personal Computer Memory Card International Association (PCMCIA) slot and card, or the like. Data transferred over communications module 266 may be in the form of signals which may be electronic, electromagnetic, optical, or other signals capable of being transmitted and received by the network interface. Communications module 266 may transmit data using any wireless transmission standard such as, for example, Bluetooth, Wi-Fi, over a cellular network, or using any other suitable or desired wireless transmission. Communications module 266 may also transmit data using Bluetooth Low Energy (Bluetooth LTE) operating in the 2.4 GHz ISM band.

In various embodiments, and with reference again to FIG. 1, payment network 170 may be configured to register one or more vehicles 110 for automated remote payments, and authorize and complete automated remote payments between a vehicle 110 and a refueling station 140, as discussed further herein. Payment network 170 may comprise any suitable combination of hardware, software, and/or database components. For example, payment network 170 may comprise one or more network environments, servers, computer-based systems, processors, databases, and/or the like. Payment network 170 may comprise at least one computing device in the form of a computer or processor, or a set of computers/processors, although other types of computing units or systems may be used such as, for example, a server, web server, pooled servers, or the like. Payment network 170 may also include one or more data centers, cloud storages, or the like. In various embodiments, payment network 170 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, payment network 170 may comprise or interact with a traditional payment network to facilitate purchases and payments, authorize transactions, and/or settle transactions. For example, payment network 170 may represent existing proprietary networks that presently accommodate transactions for credit cards, debit cards, and/or other types of transaction accounts or transaction instruments. Payment network 170 may be a closed network that is secure from eavesdroppers. In various embodiments, payment network 170 may comprise an exemplary transaction network such as AMERICAN EXPRESS®, VISANET®, MASTERCARD®, DISCOVER®, INTERAC®, Cartes Bancaires, JCB®, private networks (e.g., department store networks), and/or any other payment network. Payment network 170 may include systems and databases related to financial and/or transactional systems and processes such as, for example, one or more authorization engines, authentication engines and databases, settlement engines and databases, accounts receivable systems and databases, accounts payable systems and databases, and/or the like. For example, payment network 170 may authorize and settle payment transactions, and maintain transaction account member databases, accounts receivable databases, accounts payable databases, or the like.

In various embodiments, phrases and terms similar to "financial institution," "transaction account issuer," "issuer system," "payment network," or the like may include any entity that offers transaction account services. Although often referred to as a "financial institution," payment network 170 may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

In various embodiments, and with specific reference to FIG. 2, components of payment network 170 are depicted in greater detail. Payment network 170 may comprise one or more of a remote payment gateway 280, a vehicle database 285, and/or a transaction systems 290. The various systems, gateways, platforms, databases, and the like in payment network 170 may be in direct logical communication with each other via a bus, network, and/or through any other suitable means, or may be individually connected as described further herein. For the sake of brevity, conventional data networking, application development, and other functional aspects of payment network 170 (and components of the individual operating components of payment network 170) may not be described in detail herein. Furthermore, the connecting lines shown in the various figures contained herein are intended to represent exemplary functional relationships and/or physical couplings between the various elements in payment network 170. It should be noted that many alternative or additional functional relationships or physical connections may be present in a practical system.

Remote payment gateway 280 may be configured to receive, authorize, and process automated remote payments, as discussed further herein. Remote payment gateway 280 may be in electronic and/or logical communication with vehicle database 285 and/or transaction systems 290, and may comprise any suitable combination of hardware, software, and/or database components. Phrases similar to "remote payment gateway," "payment gateway" or "gateway" may include an application service provider service that authorizes payments for e-businesses, online retailers, and/or traditional brick and mortar merchants. The gateway may be the equivalent of a physical point of sale terminal located in most retail outlets. Remote payment gateway 280 may protect transaction account details by encrypting sensitive information, such as transaction account numbers, to ensure that information passes securely between the customer and the merchant and also between merchant and payment processor. Remote payment gateway 280 may be configured to process payments for a particular geographic region, use, or the like. In that respect, payment network 170 may comprise one or more remote payment gateways 280.

Vehicle database 285 may be configured to store and maintain data regarding each vehicle 110. For example, vehicle database 285 may store and maintain stored vehicle identifying data corresponding to the vehicle identifying data stored in each vehicle 110. Vehicle database 285 may further comprise associated transaction account data corresponding to each vehicle 110 registered with payment network 170. For example, vehicle database 285 may store and associate with each stored vehicle identifying data a user identifier (e.g., user ID), transaction account number, or the like. Vehicle database 285 may be in electronic and/or logical communication with remote payment gateway 280 and/or transaction systems 290, and may comprise any suitable type of database or database structure.

Transaction systems 290 may be configured to register one or more vehicles 110 with payment network 170 and receive and settle the automated remote payments, as discussed further herein. Transaction systems 290 may comprise one or more backend systems, payment processing systems, or the like in payment network 170. For example, transaction systems 290 may comprise one or more authorization engines, authentication engines and databases, settlement engines and databases, accounts receivable systems and databases, accounts payable systems and databases, and/or the like. Transaction systems 290 may also comprise a tokenization engine configured to tokenize transaction account numbers when provisioning a transaction account number to a vehicle 110, as discussed further herein. Transaction systems 290 may be in electronic and/or logical communication with remote payment gateway 280 and/or vehicle database 285.

The various communications discussed herein may be performed using a network. As used herein, the term "network" may further include any cloud, cloud computing system or electronic communications system or method that incorporates hardware and/or software components. Communication among the parties may be accomplished through any suitable communication channels such as, for example, a telephone network, an extranet, an intranet, Internet, point of interaction device (point of sale device, personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, AppleTalk, IP-6, NetBIOS, OSI, any tunneling protocol (e.g., IPsec, SSH, etc.), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal. Schorr signature, DSA, PGP, PKI, GPG (GnuPG), and symmetric and asymmetric cryptosystems. Asymmetric encryption in particular may be of use in signing and verifying signatures for blockchain crypto operations.

Referring now to FIGS. 3 and 4, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIGS. 3 and 4, but also to the various system components as described above with reference to FIGS. 1 and 2.

With specific reference to FIG. 3, a process 301 for registering a vehicle for automated remote payments is disclosed, in accordance with various embodiments. A user (e.g., a vehicle driver, etc.) may access multimedia center 215 in vehicle 110 to begin the registration and onboarding process for automated remote payments. For example, the user may interface with multimedia center 215 to access payment network 170. In various embodiments, payment network 170 may require the user to login to access payment network 170 such as, for example, by inputting a username and password, biometric input, or the like. In various embodiments, payment network 170 may not require a login in order for the user to begin vehicle registration for automated remote payments. In various embodiments, payment network 170 receives a vehicle registration request (step 302) from vehicle 110. In response to receiving the vehicle registration request, payment network 170 retrieves vehicle identifying data (step 304) from vehicle 110. For example, payment network 170 may communicate with processor 223 to retrieve vehicle identifying data (e.g., the vehicle identification number (VIN), the vehicle manufacture date, the vehicle make, the vehicle model, etc.) from memory 225. Processor may retrieve the vehicle identifying data and transmit the data to payment network 170.

Payment network 170 determines whether additional authentication is needed (step 306). In response to determining that additional authentication is needed (e.g., based on a fraud determination using stored fraud information, or the like), payment network 170 may be configured to prompt the user for additional information. For example, payment network 170 may be configured to prompt the user, via multimedia center 215, to input user identification data, such as, a driver's license, identification card, passport, social security number (SSN), biometric input and/or any other identity-based data. In that respect, and in accordance with various embodiments, payment network 170 may complete the addition authentication via multimedia center 215 without needing user input from a smartphone, user device, or the like. Payment network 170 may validate the user identification data using internal and/or external data sources. For example, payment network 170 may validate the user identification data by querying LEXIS NEXIS®, the United States Post Office, utility providers, password validation services, and/or any other consumer reporting agency, vendor, database, or system that provides information regarding consumers and businesses. The internal and/or external data source may return whether the user identification data is accurate and valid. As a further example, payment network 170 may prompt the user with a multi-factor authentication request. For example, if the user previously registered with payment network 170 using a biometric input, payment network may prompt the user to input the biometric input together with the user's password (e.g., a 2-factor authentication), via multimedia center 215. As a further example, two-factor authentication may comprise sending an authentication number (e.g., a PIN, a code, a 6-digit number, etc.) via an established email address or mobile phone number (via SMS), and prompting the user to input the authentication number into multimedia center 215 before proceeding.

In various embodiments, payment network 170 may prompt the user to select a transaction account to provision (step 308). For example, in response to the user having more than one transaction account, or sub-accounts, registered with payment network 170, payment network 170 may prompt the user to select the transaction account to use for automated remote payments. In various embodiments, the user may select to provision a different transaction account, or sub-account, based on different refueling stations (e.g., by brand; by type, such as electric, gasoline, etc.; and the like), based on different operators of vehicle 110 (e.g., based on biometric input into multimedia center 215).

In various embodiments, the user may also select one or more payment restriction controls for each provisioning transaction account. For example, the user may select a monetary value to provision in a given transaction account (e.g., $50.00), a monetary limit (e.g., the remote payment is authorized up to $50.00), and/or any other suitable payment restriction control.

Payment network 170 maps the vehicle identifying data to the user transaction account data (step 310) and stores the data in vehicle database 285. For example, payment network 170 may store the vehicle identifying data and the associated user account data based on a user identifier or the like.

Payment network 170 generates a private key and public key pair (step 312) and transmits the key pair to TPM 230 of vehicle 110. Payment network 170 may generate the asymmetric key pair using any suitable technique and key hierarchy. Payment network 170 may transmit the private key and public key pair to TPM 230, via processor 223.

Payment network 170 generates a payment token (step 314) based on the provisioned transaction account. For example, payment network 170, via a tokenization engine or the like in transaction systems 290, may tokenize the provisioned transaction account (e.g., primary account number (PAN), etc.) to create the payment token (e.g., a digitized primary account number (dPAN)) to provide additional levels of security. Payment network 170, via transaction systems 290, may also generate limited use payment credentials (LUPC), a unique derived key (UDK), or the like depending on the protection profile of vehicle 110. The payment token may also comprise the payment restriction controls defined in step 308. Payment network 170 may return a registration completion notice to the user, via multimedia center 215. In various embodiments, the payment token may be stored in payment network 170, such as, for example, in a token vault, a token service provider, or the like. In various embodiments, the payment token may be transmitted to vehicle 110 and may be stored in memory 225 of remote payment system 220.

With specific reference to FIG. 4, a process 401 for initiating an automated remote payment between a vehicle and a refueling station is disclosed, in accordance with various embodiments. Vehicle 110 may access refueling station 140 to begin the process of refueling vehicle 110. Refueling station 140 detects that a vehicle 110 is in proximity (step 402). Proximity sensor 263 of refueling station 140 may detect that vehicle 110 is in proximity of refueling station 140 and may transmit a proximity notification to point of sale 250. Refueling station 140 attempts to open communications with vehicle 110 (step 404). In response to receiving the proximity notification, point of sale 250 may instruct communications module 266 (e.g., the refueling station communications module) to check for beacon broadcasts being transmitted by communications module 227 (e.g., the vehicle communications module) of vehicle 110 over Bluetooth LTE, or any other wireless transmission. In various embodiments, vehicle 110 may also be configured to initiate communications with refueling station 140. For example, vehicle 110 may be configured to identify and read an RFID tag, OCR, QR code, or the like affixed or imprinted on refueling station 140. Vehicle 110 may initiate communications with refueling station 140, via communications module 227, based on a refueling station ID or the like identified in the RFID tag, OCR, QR code, or the like.

Refueling station 140 verifies that vehicle 110 is capable of automated remote payments (step 406). For example, in response to locating a beacon broadcast being transmitted by communications module 227, communications module 266 may initiate a handshake and may pass data to verify that vehicle 110 is capable of performing the automated remote payment. For example, in response to receiving a response from vehicle 110, via communications module 227, refueling station 140 may verify that vehicle 110 is capable of automated remote payments. In response to receiving no response from vehicle 110, refueling station 140 may stop the remote payment process and allow the vehicle to proceed with a typical payment and refueling process. Refueling station 140, via communications module 266, may also transmit refueling data such as, for example, the available fuel options (e.g., unleaded, premium unleaded, etc.), the cost per each available fuel option (e.g., $3.25/gallon, $3.35/gallon, etc.), and/or the like. Refueling station 140 may prompt vehicle 110 to transmit vehicle identifying data to initiate the transaction. Vehicle 110 may retrieve the vehicle identifying data from memory 225 and encrypt the data using the private key stored in TPM 230. Vehicle 110 transmits encrypted vehicle identifying data to refueling station 140 (step 408). In response to receiving the encrypted vehicle identifying data, point of sale 250 in refueling station 140 transmits the encrypted vehicle identifying data to payment network 170 (step 410), via remote payment gateway 280. Point of sale 250 may also transmit a merchant ID, refueling station ID, or the like to notify payment network 170 of the account payment is to be transferred to.

In various embodiments. TPM 230 may also be configured to transmit, via communications module 227, one or more vehicle integrity metrics to payment network 170. For example, TPM 230 may act as a root of trust (RoT), and may provide a RoT for storage, a RoT for measurement, a RoT for reporting, and/or the like. TPM 230 may calculate vehicle integrity metrics based on Trusted Computing Group (TCG) 2.0 specifications. In that regard, TPM 230 may measure ranges of code and firmware to generate a baseline vehicle integrity metric, and may store the baseline vehicle integrity metric in a platform configuration register (PCR) in TPM 230. At the time of sale, TPM 230 may again measure ranges of code and firmware to generate a second vehicle integrity metric. TPM 230 may compare the baseline vehicle integrity metric with the second vehicle integrity metric to determine whether an unauthorized change has occurred. TPM 230 may transmit the vehicle integrity metric to payment network 170.

In various embodiments, vehicle 110 generates a payment cryptogram (step 412) and transmits the payment cryptogram to payment network 170 (step 414). The payment cryptogram may be generated to comprise an authorized payment amount for the transaction. For example, remote payment system 220 may communicate with the fuel system of vehicle 110 to determine the level of fuel in vehicle 110, and the amount needed to refuel vehicle 110. Based on the refueling amount and the refueling data transmitted by communications module 266 in step 406, remote payment system 220 may calculate the authorized payment amount and generate the payment cryptogram to comprise the authorized payment amount. In various embodiments, remote payment system 220 may also prompt the user, via multimedia center 215, to select an available fuel option or grade, to select a full tank or a portion of a tank, or to manually input the authorized payment amount for the transaction.

In various embodiments, payment network 170 may prompt the user for payment authentication (step 416). For example, payment network 170 may be configured to prompt the user, via multimedia center 215, to verify the transaction authorization using a multi-factor authentication request. For example, if the user previously registered with payment network 170 using a biometric input, payment network may prompt may the user to input the biometric input either alone or together with the user's password (e.g., a 2-factor authentication), via multimedia center 215. As a further example, two-factor authentication may comprise sending an authentication number (e.g., a PIN, a code, a 6-digit number, etc.) via an established email address or mobile phone number (via SMS), and prompting the user to input the authentication number into multimedia center 215 before proceeding with the transaction.

Payment network 170 processes the encrypted vehicle identifying data and the payment cryptogram (step 418). For example, payment network 170 may use the public key to decrypt the vehicle identifying data and may compare the decrypted vehicle identifying data to the stored vehicle identifying data from vehicle database 285 to determine whether the decrypted vehicle identifying data matches the stored vehicle identifying data. Payment network 170 may authorize and settle the transaction using any suitable method.

Payment network 170 transmits a remote payment approval (step 420) to vehicle 110 and/or refueling station 140. The remote payment approval may comprise data indicating that the transaction was successfully authorized. The remote payment approval may also comprise the payment amount authorized for the transaction. In various embodiments, in response to receiving the remote payment approval, remote payment system 220 may transmit an electronic signal to the vehicle 110 fuel system to open and/or unlock the gas tank refueling cover. Remote payment system 220 may also notify the user, via multimedia center 215, that the user may begin refueling the vehicle 110. In response to receiving the remote payment approval, refueling station 140 may display that the user may begin refueling. In various embodiments, refueling station 140 may comprise an automated refueling station. In response to receiving the remote payment approval, refueling station 140 may be configured to automate the refueling process by connecting a gas hose, an electrical hose, etc. to vehicle 110, and begin the refueling process. In response to completing the refueling process, refueling station 140 may be configured to disconnect the gas hose, electrical hose, etc. from vehicle 110.

In various embodiments, vehicle 110 completes refueling at refueling station 140 (step 422). In response to the refueling process completing, refueling station 140 may transmit a refueling completion notification to remote payment gateway 280. Payment network 170 may transmit transaction data to vehicle 110, and vehicle 110 may store the data as a record of automated remote payments completed by vehicle 110.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements such as, for example, (i) a transaction account and (ii) an item (e.g., offer, reward points, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

In various embodiments, vehicle 110, and/or one or more computer systems, components, or the like comprised therein, may integrate with system integration technology such as, for example, the ALEXA system developed by AMAZON®, GOOGLE HOME®, APPLE® HOMEPOD®, or the similar digital assistant technologies. AMAZON ALEXA, GOOGLE HOME®, and APPLE® HOMEPOD®, may all provide cloud-based voice services that can assist with tasks, entertainment, general information, and more. All AMAZON® ALEXA devices, such as the AMAZON ECHO®, AMAZON ECHO DOT®, AMAZON TAP®, and AMAZON FIRE® TV, have access to the ALEXA system. The ALEXA, GOOGLE HOME®, and APPLE® HOMEPOD® systems may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The ALEXA, GOOGLE HOME®, and APPLE® HOMEPOD® systems may allow the user to access information about eligible accounts linked to an online account across all ALEXA-enabled devices.

The phrases consumer, customer, user, account holder, account affiliate, cardmember or the like shall include any person, entity, business, government organization, business, software, hardware, machine associated with a transaction account, who buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE® TV®, PANDORA®, XBOX®, SONY® PLAYSTA-TION®), a uniform resource locator ("URL"), a document (e.g., a MICROSOFT® Word® document, a MICROSOFT® Excel® document, an ADOBE® .pdf document, etc.), an "ebook." an "emagazine," an application or microapplication (as described herein), an SMS or other type of text message, an email, a FACEBOOK® message, a TWITTER® tweet. MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website or application; a social media site, application, or platform; affiliate or partner websites and applications; an external vendor, and a mobile device communication. Examples of social media sites, applications, and platforms may include FACEBOOK®, INSTAGRAM®, LINKEDIN®, PINTEREST®, QZONE®, SNAPCHAT®, TWITTER®, VKontakte (VK) and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, and in accordance with various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

The computer system also includes a main memory, such as for example random access memory (RAM), and may also include a secondary memory or in-memory (non-spinning) hard drives. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

The computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data files transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEBSPHERE®, WEBLOGIC®, JBOSS®, EDB® POSTGRES PLUS ADVANCED SERVER® (PPAS), etc.). In various embodiments, the server may include web servers (e.g. APACHE®, IIS, GWS, SUN JAVA® SYSTEM WEB SERVER, JAVA® Virtual Machine running on LINUX® or WINDOWS®).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MAC-BOOKS®, kiosks, terminals, point of sale (POS) devices and/or terminals, televisions, or any other device capable of receiving data over a network. A web-client may run MICROSOFT® INTERNET EXPLORER®, MOZILLA®

FIREFOX®, GOOGLE® CHROME®, APPLE® Safari, or any other of the myriad software packages available for browsing the internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS. SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system. APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, "issue a debit," "debit" or "debiting" refers to either causing the debiting of a stored value or prepaid card-type financial account, or causing the charging of a credit or charge card-type financial account, as applicable.

Any databases discussed herein may include relational, hierarchical, graphical, blockchain, or object-oriented structure and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MySQL by MySQL AB (Uppsala, Sweden), MONGODB®, REDIS®, APACHE CASSANDRA®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones. Internet of Things devices ("IoT" devices), etc. The applications may communicate with the blockchain (e.g., directly or via a blockchain node) to transmit and retrieve data In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM●-based network, a new data entry may become available within about 13-20 seconds as of the writing. On a Hyperledger● Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the blockchain-based system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017. U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, and U.S. application Ser. No. 15/943,271 titled FRAUD MANAGEMENT USING A DISTRIBUTED DATABASE and filed on Apr. 2, 2018, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memo), management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG). HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable. DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT®, active server pages (ASP), common gateway interface scripts (CGI), extensible markup language (XML), dynamic HTML, cascading style sheets (CSS), AJAX (Asynchronous JAVASCRIPT® And XML), helper applications, plug-ins, and the like. A server may include a web service that receives a request from a web server, the request including a URL and an IP address (e.g., 10.0.0.2). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE® MQ™ (formerly MQSeries) by IBM®, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures. PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as npm®, may be implemented as an open source library to aid in organizing the installation and management of third-party Node.js® programs. Node.js® may also implement a process manager such as, for example, Parallel Multithreaded Machine ("PM2"); a resource and performance monitoring tool such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIGS. 3 and 4, the process flows and/or screenshots depicted are merely embodiments and are not intended to limit the scope of the disclosure. For example, the steps recited in any of the method or process descriptions may be executed in any order and are not limited to the order presented.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In re Nuijten* to fall outside the scope of patentable subject matter under 35 U.S.C. § 101.

Phrases and terms similar to "account" "account number," "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

The disclosure and claims do not describe only a particular outcome of automating remote payments between a vehicle and a refueling station, but the disclosure and claims include specific rules for implementing the outcome of automating remote payments between a vehicle and a refueling station and that render information into a specific format that is then used and applied to create the desired results of enabling automating remote payments between a vehicle and a refueling station, as set forth in *McRO, Inc.*v. *Bandai Namco Games America Inc*. (Fed. Cir. case number 15-1080, Sep. 13, 2016). In other words, the outcome of enabling automating remote payments between a vehicle and a refueling station can be performed by many different types of rules and combinations of rules, and this disclosure includes various embodiments with specific rules. While the absence of complete preemption may not guarantee that a claim is eligible, the disclosure does not sufficiently preempt the field of automating remote payments between a vehicle and a refueling station at all. The disclosure acts to narrow, confine, and otherwise tie down the disclosure so as not to cover the general abstract idea of just automating remote payments between a vehicle and a refueling station. Significantly, other systems and methods exist for automating remote payments between a vehicle and a refueling station, so it would be inappropriate to assert that the claimed invention preempts the field or monopolizes the basic tools of automating remote payments between a vehicle and a refueling station. In other words, the disclosure will not prevent others from automating remote payments between a vehicle and a refueling station, because other systems are already performing the functionality in different ways than the claimed invention. Moreover, the claimed invention includes an inventive concept that may be found in the non-conventional and non-generic arrangement of known, conventional pieces, in conformance with *Bascom* v. *AT&T Mobility,* 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the systems and methods may include a graphical user interface for dynamically relocating/rescaling obscured textual information of an underlying window to become automatically viewable to the user (e.g., via multimedia center 215). By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., automated remote payments) to prevent a computer or network from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B. A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for automated remote payments comprising:
   determining, by a computing device on a vehicle, fueling information specifying an amount of fuel to refill the vehicle, wherein the amount of fuel to refill is determined based on a level of fuel of the vehicle;
   transmitting, by the computing device and to a refueling station, an identifier of the vehicle and the fueling information based on the vehicle being within a proximity to the refueling station, wherein the identifier of the vehicle is encrypted using a stored private key;
   receiving, by the computing device and from a payment network, an authentication request message requesting authentication data to provide payment for fuel;
   calculating a vehicle integrity metric of the vehicle;
   comparing the vehicle integrity metric with a baseline vehicle integrity metric to determine whether an unauthorized change has occurred in the vehicle;
   transmitting, by the computing device and to the payment network, the authentication data comprising a payment cryptogram of an authorized payment amount, the identifier of the vehicle, and the vehicle integrity metric;
   receiving, by the computing device and from the payment network, an approval message indicating that the payment for the fuel is authorized based on decrypting the identifier of the vehicle using a public key assigned to the identifier of the vehicle and paired with the stored private key; and
   in response to receiving the approval message, unlocking, by the computing device, a fueling cover of the vehicle.

2. The method of claim 1, wherein the authentication data further comprises a biometric sample, and wherein transmitting the authentication data further comprises:
   displaying, via a multimedia center in the vehicle, a request for the biometric sample;
   collecting, via the multimedia center, the biometric sample; and
   transmitting, by the computing device and to the payment network, biometric sample data.

3. The method of claim 2, wherein the biometric sample comprises a fingerprint.

4. The method of claim 1, further comprising:
   in response to receiving the approval message, displaying, via a multimedia center in the vehicle, an indication that the payment for the fuel is authorized.

5. The method of claim 1, wherein the authentication data further comprises a password, and wherein transmitting the authentication data further comprises:
   displaying, via a multimedia center in the vehicle, a request for the password;
   receiving, via the multimedia center in the vehicle, the password; and
   transmitting, by the computing device, the password to the payment network.

6. The method of claim 1, wherein the authentication data further comprising a password and a biometric sample, and wherein transmitting the authentication data further comprises:

displaying, via a multimedia center in the vehicle, a request for the biometric sample and the password;

collecting, via the multimedia center, the biometric sample and the password; and transmitting, by the computing device and to the payment network, biometric sample data and the password.

7. The method of claim 6, wherein the biometric sample comprises a fingerprint.

8. The method of claim 1, further comprising:

receiving, by the computing device and from the refueling station, a list of fuel options;

displaying, by the computing device, the list of fuel options at a multimedia center in the vehicle; and transmitting, by the computing device to the refueling station, a selected fuel option from the list of fuel options.

9. A vehicle computer system, comprising:

a processor; and a tangible, non-transitory memory configured to communicate with the processor, the tangible, non-transitory memory having instructions stored thereon that, in response to execution by the processor, cause the processor to perform operations comprising:

determining fueling information specifying an amount of fuel to refill a vehicle, wherein the amount of fuel to refill is determined based on a level of fuel of the vehicle;

transmitting, to a refueling station, an identifier of the vehicle and the fueling information based on the vehicle being within a proximity to the refueling station, wherein the identifier of the vehicle is encrypted using a stored private key;

receiving, from a payment network, an authentication request message requesting authentication data to provide payment for fuel;

calculating a vehicle integrity metric of the vehicle;

comparing the vehicle integrity metric with a baseline vehicle integrity metric to determine whether an unauthorized change has occurred in the vehicle;

transmitting, to the payment network, the authentication data comprising a payment cryptogram of an authorized payment amount, the identifier of the vehicle, and the vehicle integrity metric;

receiving, from the payment network, an approval message indicating that the payment for the fuel is authorized based on decrypting the identifier of the vehicle using a public key assigned to the identifier of the vehicle and paired with the stored private key; and in response to receiving the approval message, unlocking a fueling cover of the vehicle.

10. The vehicle computer system of claim 9, wherein the authentication data further comprises a biometric sample, and wherein transmitting the authentication data further comprises:

displaying, via a multimedia center in the vehicle, a request for the biometric sample;

collecting, via the multimedia center, the biometric sample; and transmitting, to the payment network, biometric sample data.

11. The vehicle computer system of claim 10, wherein biometric sample comprises a fingerprint.

12. The vehicle computer system of claim 9, wherein the authentication data further comprises a password, and wherein transmitting the authentication data further comprises:

displaying, via a multimedia center in the vehicle, a request for the password;

receiving, via the multimedia center in the vehicle, the password; and transmitting the password to the payment network.

13. The vehicle computer system of claim 9, wherein the authentication data further comprises a password and a biometric sample, and wherein transmitting the authentication data further comprises:

displaying, via a multimedia center in the vehicle, the request for the biometric sample and the password;

collecting, via the multimedia center, the biometric sample and the password; and transmitting, to the payment network, biometric sample data and the password.

14. The vehicle computer system of claim 13, wherein the biometric sample comprises a fingerprint.

15. A method for automating remote payments for vehicle fueling stations, comprising:

detecting, by a fueling station, that a vehicle is in a proximity of the fueling station via a proximity sensor of the fueling station;

establishing, by the fueling station, a communication channel between the fueling station and the vehicle;

receiving, by the fueling station and from the vehicle, an identifier of the vehicle and fueling information specifying an amount of fuel to refill the vehicle via the communication channel, wherein the amount of fuel to refill is determined based on a level of fuel of the vehicle and wherein the identifier of the vehicle is encrypted using a stored private key;

authorizing, by the fueling station, an automated remote payment with a payment network by:

calculating a vehicle integrity metric of the vehicle;

comparing the vehicle integrity metric with a baseline vehicle integrity metric to determine whether an unauthorized change has occurred in the vehicle;

transmitting, from the vehicle to the payment network, authentication data comprising a payment cryptogram of an authorized payment amount, the identifier of the vehicle, and the vehicle integrity metric; and receiving, by the fueling station and from the payment network, a message indicating that the vehicle is registered with the payment network;

receiving, by the fueling station and from the payment network, a payment approval message indicating the authorized payment amount based on decrypting the identifier of the vehicle using a public key assigned to the identifier of the vehicle and paired with the stored private key; and dispensing, by the fueling station, an amount of fuel to the vehicle based on the authorized payment amount.

16. The method of claim 15, further comprising:

receiving, by the fueling station and from the vehicle, biometric sample data via the communication channel;

transmitting the biometric sample data to the payment network; and receiving, by the fueling station and from the payment network, a message indicating that the biometric sample data matches stored biometric sample data associated with the vehicle.

17. The method of claim 16, wherein the biometric sample data corresponds to a fingerprint.

18. The method of claim 15, further comprising:

receiving, by the fueling station and from the vehicle, a password via the communication channel, wherein the password is used to ensure authenticity of the automated remote payment;

transmitting the password to the payment network; and receiving, by the fueling station and from the payment network, a message indicating that the password matches a stored password associated with the vehicle.

19. The method of claim 18, further comprising:

receiving, by the fueling station and from the vehicle, biometric sample data and the password via the communication channel;

transmitting the biometric sample data and the password to the payment network; and receiving, by the fueling station and from the payment network, a message indicating that the biometric sample data matches stored biometric sample data associated with the vehicle and the password matches the stored password associated with the vehicle.

20. The method of claim 19, wherein the biometric sample data corresponds to a fingerprint.

\* \* \* \* \*